Figure 1:
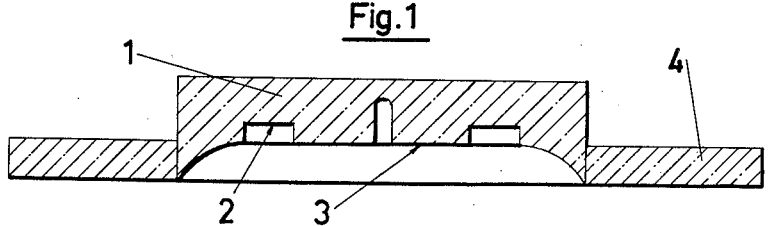
Figure 2:
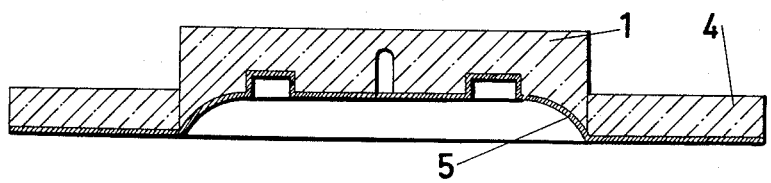

Sept. 18, 1962          V. SPRETER          3,054,175
PROCESS FOR THE MANUFACTURE OF DIALS HAVING RECESSED
MARKINGS OR MARKINGS FORMED IN RELIEF
Filed Jan. 18, 1957                        2 Sheets-Sheet 1

INVENTOR
VICTOR SPRETER
BY: Tray, Mark Dunson
ATTORNEY

Sept. 18, 1962 V. SPRETER 3,054,175
PROCESS FOR THE MANUFACTURE OF DIALS HAVING RECESSED
MARKINGS OR MARKINGS FORMED IN RELIEF
Filed Jan. 18, 1957 2 Sheets-Sheet 2
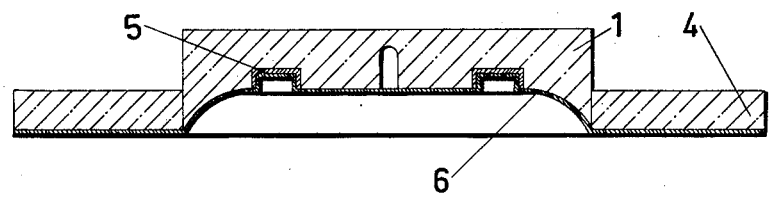
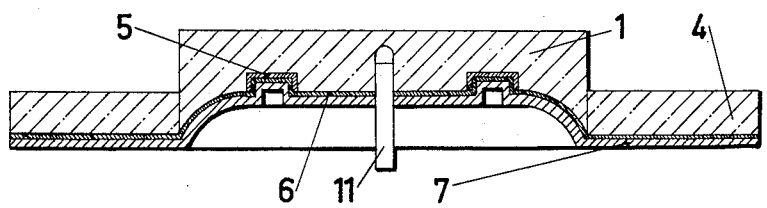
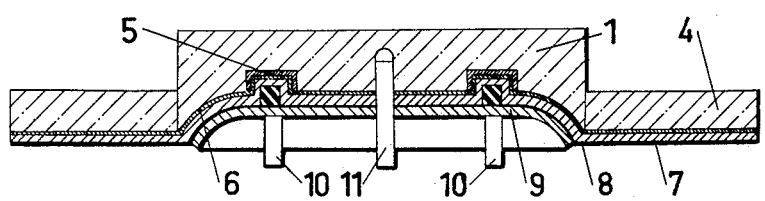
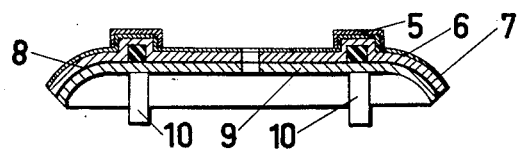
INVENTOR
VICTOR SPRETER
BY: Tray, Mace & Dunson
ATTORNEY

3,054,175
PROCESS FOR THE MANUFACTURE OF DIALS HAVING RECESSED MARKINGS OR MARKINGS FORMED IN RELIEF

Victor Spreter, Geneva, Switzerland, assignor to Fluckizer & Cie, Saint-Imier, Switzerland, a firm of Switzerland
Filed Jan. 18, 1957, Ser. No. 634,964
9 Claims. (Cl. 29—527)

The present invention has for its object a process for the manufacturing of dials having recessed markings or markings in relief.

This process is characterized by the fact that one prepares a mould forming the negative of the dial, metallizes said mould, fixes beneath the metallized layer, by at least indirect contact, the body of the dial and then removes the mould so as to effect the transfer of the metallized layer of the mould on to the body of the dial.

The accompanying drawing illustrates the process according to the present invention applied to the manufacture of a silvered clockwork dial having gilded markings in relief.

FIGS. 1 to 6 are axial cross-sections through a mould of plastic material and of a dial at different stages of execution of the process, and, FIG. 7 is a section through the completed dial.

According to one example of execution of the process, the latter consists in making in a block 1 of plastic material, an impress of the dial it is sought to obtain, the chronometric markings appearing at 2 in depression form, so that the bottom of the dial is in relief relatively to these depressions.

For reasons explained hereinafter, the mould thus formed by the block 1 is surrounded by a ring 4 also made of plastic material, in which said block is engaged by light friction.

By means of evaporation in vacuo, an extremely thin layer of gold 5 (FIG. 2) is applied on to said impress, as well as on to the ring 4. This metallization could also be effected by another process. It is to be noted that the thickness of the layer 5 in FIG. 2, as well as that of the other metallic layers in the following figures of the drawing, has been greatly exaggerated so as to increase the clarity of the drawing.

Figure 3:
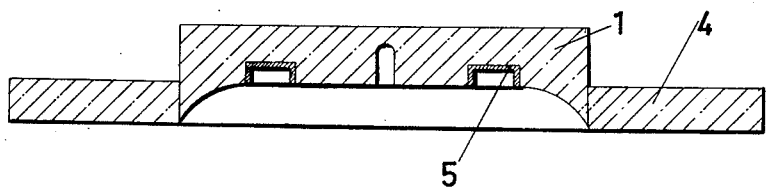

The entire metallic layer 5 is then removed, except in the recessed parts of the impress, that is to say that part 3 which is to form the bottom of the dial (FIG. 3). This layer 5 is removed by means of an adhesive fixed to a supple support such as, for example, adhesive cellophane paper.

Still by evaporation in vacuo or by any other process, a new metallic layer is applied, this time silver, designated by 6, which, as shown, covers the entire mould but will only be visible on the finished dial in those places where the layer 5 has previously been removed.

This metallized surface 6 is then treated by electrolysis so as to fix thereon a layer of nickel 7, of considerably greater thickness, intended to consolidate the layer 6. Copper or another metal could also be used. There is thus formed, at the bottom of the mould 1, a kind of metallic shell on the reverse side of which appear the recessed chronometric markings (FIG. 5). It should be noted that the electrolytic layer 7 also forms on the ring 4, and since the electrolysis is carried out beyond the limits of the dial, the applied layer is uniformly spread over the entire surface of the dial without appreciable differences in thickness. The ring 4 thus constitutes a guard ring preventing the formation of beading at the periphery of the dial.

The metallic shell is then covered with a layer of adhesive 8, preferably a resin of the epoxy type, such as the substance known in the trade under the name of "Araldite," which furthermore fills the recesses of the markings. A metallic plate 9, intended to form the body of the dial, and which is already provided with its feet 10, is applied under the shell and remains strongly adhered thereto by means of the layer of adhesive 8 (FIG. 6).

It therefore suffices, by grasping the dial by its feet 10, to separate the dial from the mould 1 to obtain the finished dial as shown in FIG. 7 in which the markings and the bottom of the dial appear directly in their finalized appearance, which is a brilliant polished appearance for the markings, and satined or brushed for the bottom of the dial, without it being necessary to touch them up. The adherence of the metallic layer on the mould is sufficiently weak for the separation to take place without difficulty.

It is to be noted that it might be advantageous, before separating the dial from the mould 1, to separate said mould from the guard ring 4, which breaks the electrolytic layer 7 and facilitates the obtention of a neat dial, without fins.

To obtain the central hole of the dial, or any other holes (for a small second hand, a chronograph counter, etc.), a pin 11, of plastic material, is placed in a corresponding hole in the mould after having effected the last metallization operation. Since this pin is not conductive, it does not become covered with metal during the electrolytic formation of the shell 7 which is thus formed with the desired hole or holes.

In a variation of the execution of the process, the mould will be made of light metal, for example aluminium.

By evaporation in vacuo, an extremely thin layer of gold is applied on the impress of the dial formed in said mould. This layer could also be applied by electrolysis. The whole of said metallic layer is then removed, except in the parts which are recessed in the impress, as in the previous embodiment.

Still by evaporation in vacuo, by eletcrolysis or any other method, a new metallic coating is applied, this time silver, which will be visible on the dial only where the first layer has previously been removed.

In the case of evaporation in vacuo, the operation will be prolonged so that the layer will become sufficiently thick to form, at the bottom of the mould, a kind of metallic shell on the back of which the chronometric markings appear in depression form. The pores of this metallic shell will then be filled by the application of a film of pewter by evaporation in vacuo.

In the case where the second metallic layer is obtained by electrolysis, the silvered surface will be treated in such a manner as to fix on to said surface, also by electrolysis, a consolidating layer of nickel of considerably greater thickness which also forms a shell at the bottom of the mould, as in the preceding embodiment.

In the same manner as in the preceding embodiment, a metallic plate forming the body of the dial is then fixed under this shell.

By way of variation, instead of epoxy resin, an adhesive can be used which does not fill the hollows of the markings, but only produces adhesion.

Plastic material, for example in powder form and of the same nature as the adhesive used, must then be moulded by hot-pressing under the metallic shell so as to form either the body proper of the dial, or an intermediary layer against which is struck by means of an adhesive, a metallic plate which is formed with the feet of the dial. In the case where the plastic material constitutes the body of the dial, a metallic powder could be incorporated in the plastic powder used so as to give the dial the appearance of the metal.

It is evident that the process according to the invention is not limited to the described and illustrated forms of execution: the dial need not be a clockwork dial; metals other than gold and silver could be deposited, for example their alloys, or metals which cannot be deposited by the electolytic processes generally employed, such as beryllium, titanium and aluminum.

It is also possible to provide surface treatment of the metallized layer after completion of the dial so as to modify the appearance of the latter. Thus, in order to obtain a black dial, the bottom could be made of a thin metallic layer of copper which is then oxydized, the chronometric markings, which are made for example of gold, remaining unaltered by this operation.

The present process could also be applied to dials having recessed markings or incrusted markings in relief. This process has the advantage that the feet are fixed to the body of the dial before the body is applied to the shell, so that any usual method of fixing the feet of the dial (soldering, riveting, etc.) can easily be used.

Since the dial emerges from the mould in its completed state, the normal finishing operations (brushing, galvanizing, faceting, etc.) become unnecessary, which constitutes an important saving in the cost of production of the dial.

Furthermore, the process broadens the scope for coating since it is freed from the limits set by electrolysis, as has been seen above.

Finally, contrary to the usual processes, the sides of the relief markings have the same appearance as the face of the markings so that the dial obtained is suggestful of a luxury dial in which the chronometric markings are constituted by solid gold carried by the base plate of the dial.

What I claim is:

1. In a process for the manufacture of a clockwork dial or the like, the steps which comprise: metallizing, by evaporation in vacuo, a mould forming the negative of said dial, whereby metallized portions are formed; forming by electrolysis a metallic consolidating layer upon said metallized portions; positioning beneath and fixing to said consolidating layer, by at least indirect contact, the body portions of said dial; and removing said mould from the resulting structure, whereby the transfer of said metallized portions from said mould onto said dial body is effected.

2. In a process for the manufacture of a clockwork dial having raised markings thereon, the steps which comprise: metallizing, by evaporation in vacuo, a mould forming the negative of said dial; removing the metallized layer thus obtained from the mould portions appearing in relief on said mould; remetallizing said mould by evaporation in vacuo so as to produce a second metallized layer; forming by electrolysis a metallic consolidating layer over the metallized portions previously deposited by evaporation in vacuo; fixing beneath said consolidating layer by adhesive means the body portions of said dial; and removing said mould from the resulting structure, whereby the transfer of all of said metallic portions from said mould onto said dial body is effected.

3. In the manufacture of a clockwork dial having markings in relief, the steps which comprise: metallizing a mould forming the negative of said dial; removing the resulting metal layer from the mould portions forming the negative of the dial portions not in relief; remetallizing said mould so as to produce a second metal layer; positioning beneath and fixing to said second metal layer, by at least indirect contact, the body portions of said dial; and removing said mould from the resulting structure, whereby the transfer of said layers from said mould onto said dial body is effected.

4. In the manufacture of a clockwork dial having markings in relief, the steps which comprise: metallizing, by evaporation in vacuo, a mould forming the negative of said dial; removing, by adhesive means, the resulting metal layer from the mould portions forming the negative of the dial portions not in relief; remetallizing said entire mould so as to produce a second metal layer; positioning beneath and fixing to said second metal layer, by at least indirect contact, the body portions of said dial; and removing said mould from the resulting structure, whereby the transfer of said metal layers from said mould onto said dial body is effected.

5. The process of claim 4 in which the second metal layer is applied by evaporation in vacuo.

6. In the manufacture of a clockwork dial having markings in relief, the steps which comprise: metallizing a mould forming the negative of said dial so as to produce a thin metal layer on said mould; removing the metallized layer thus obtained from the mould surface appearing in relief on said mould; remetallizing said entire mould so as to produce a second thin metal layer on said mould; forming a metallic consolidating layer over the metal portions previously applied; fixing to said consolidating layer the body portions of said dial; and removing said mould from the resulting structure, whereby the transfer of said metal portions from said mould onto said dial body is effected.

7. In the manufacture of a clockwork dial having markings in relief, the steps which comprise: metallizing a mould forming the negative of said dial so as to produce a thin metal layer on said mould; removing the metallized layer thus obtained from the mould surface appearing in relief on said mould; remetallizing said entire mould so as to produce a second thin metal layer on said mould; forming a metallic consolidating layer over the metal portions previously applied; applying a layer of adhesive over said consolidating layer; fixing to said adhesive the body portions of said dial; and removing said mould from the resulting structure, whereby the transfer of said metal portions from said mould onto said dial body is effected.

8. The method of claim 7 wherein the first two metallizations are accomplished by evaporation in vacuo.

9. The method of claim 8 wherein the metallic consolidating layer is formed by electrolysis.

References Cited in the file of this patent

UNITED STATES PATENTS

| | | |
|---|---|---|
| 1,614,263 | Spencer | Jan. 11, 1927 |
| 2,174,899 | Selsky | Oct. 23, 1939 |
| 2,349,920 | Welcome | May 30, 1944 |
| 2,357,950 | Goessling | Sept. 12, 1944 |
| 2,444,532 | Richardson | July 6, 1948 |
| 2,666,008 | Enslein | Jan. 12, 1954 |
| 2,715,363 | Hoover | Aug. 16, 1955 |
| 2,728,693 | Cado | Dec. 27, 1955 |
| 2,765,248 | Beech | Oct. 2, 1956 |